United States Patent [19]

Gibbons

[11] Patent Number: 4,580,794
[45] Date of Patent: Apr. 8, 1986

[54] SILICON RUBBER GASKET AND MATERIAL

[75] Inventor: Robert M. Gibbons, Fort Worth, Tex.

[73] Assignee: Jamak, Inc., Ft. Worth, Tex.

[21] Appl. No.: 672,115

[22] Filed: Nov. 16, 1984

[51] Int. Cl.⁴ .................... B32B 5/16; B32B 9/00; F16J 15/12

[52] U.S. Cl. .................... 277/228; 277/1; 277/DIG. 6; 156/329; 428/405

[58] Field of Search ............ 277/1, 227, 228, 233, 277/234, 235 R, 235 A, DIG. 6; 156/326–329; 428/402.24, 403–407

[56] References Cited

U.S. PATENT DOCUMENTS

| 3,524,794 | 8/1970 | Jonnes et al. | 428/405 X |
| 3,986,213 | 10/1976 | Lynch | 3/36 |
| 4,049,856 | 9/1977 | Adams | 428/131 |
| 4,180,211 | 12/1979 | Olcott et al. | 239/265.43 |
| 4,220,342 | 9/1980 | Shah | 277/228 |
| 4,356,116 | 10/1982 | Beers | 156/329 X |
| 4,451,542 | 5/1984 | Ishida et al. | 429/174 |
| 4,451,584 | 5/1984 | Schaefer | 521/54 |

FOREIGN PATENT DOCUMENTS

| 814855 | 6/1969 | Canada | 277/1 |
| 950349 | 7/1974 | Canada | 277/1 |
| 53-99255 | 8/1978 | Japan | 277/DIG. 6 |
| 852887 | 11/1960 | United Kingdom | 277/DIG. 6 |

Primary Examiner—Robert S. Ward
Attorney, Agent, or Firm—James E. Bradley

[57] ABSTRACT

An improved silicone rubber gasket having improved oil resistance, permeability characteristics and compressive set characteristics. The silicone rubber composition utilized is made from an organopolysiloxane gum, a silica filler, a quantity of hollow microspheres, and a curing catalyst. The polysiloxane, microspheres, and filler material are first blended to form the uncured rubber compositions. The rubber composition is then mixed with a suitable catalyst and cured in the desired shape. The microspheres are selected to have the requisite strength for being milled or mixed into the silicone rubber compound without fracturing.

7 Claims, 4 Drawing Figures

SILICON RUBBER GASKET AND MATERIAL

BACKGROUND OF THE INVENTION

1. Field of the Invention

The present invention relates to heat curable silicone rubber seal and gasket materials and, specifically, such a material containing hollow microspheres.

2. Description of the Prior Art

Silicone compositions were produced commercially as early as the late 1930's and early 1940's. The unique physical properties of silicone, such as its thermal resistance and dielectric properties, made silicone compositions well suited for numerous applications. Early uses for silicone compositions included electrical insulating applications and greases for military use. One class of silicone compositions, silicone elastomers or rubbers, are recognized for their outstanding ability to resist change at elevated temperature and exposure to adverse weather conditions over extended periods of time. Silicone rubbers have today evolved to become very versatile elastomers with the estimated annual silicone usage in the United States having grown to over 50 million pounds.

Because of their special properties, silicone rubbers have mainly been used in the past in applications at extremely high or low temperatures. Typical uses are wire and cable insulation, seals and gaskets for aircraft, and seals for electric and electronic equipment. They are effective in an approximate range of minus 50° F. to 450° F.-500° F.

Because of their special characteristics, silicone rubbers have not, in general, been widely used to form more typical seals such as those found in lighting fixtures, window seals, oven door seals, or oil seals.

A need exists for a composition and method of producing a silicone rubber seal or gasket which utilizes commercially available materials and which can be carried out economically with a minimum of extra manufacturing steps and without requiring highly controlled process conditions.

A need exists for a silicone rubber seal suitable for use in lighting gaskets, window seals, oven door seals, and oil seals which exhibits reduced permeability against gasses, water vapor, oil and other contaminants. A need exists for such a seal with an improved compression set where the seal material is used to join interfitting components and where the components are torqued down in sealing relationship.

SUMMARY OF THE INVENTION

An improved gasket is shown for joining and sealing interfitting components. The gasket has a body portion which is formed from a heat cured silicone rubber and includes a peripherally continuous outer face and a radially inwardly projecting portion. The radially inwardly projecting portion has upper and lower surfaces which are disposed in sealing relation between the interfitting components. The radially inwardly projecting portion has at least one opening therethrough. A heat cured silicone rubber is used to form the gasket. The rubber composition has 5% to 50% by weight hollow microspheres which are evenly disbursed therein, the microspheres having a specific gravity in the range from about 0.5 to 1.2.

The silicone rubber composition is preferably blended from an organopolysiloxane elastomer and can include filler materials, processing aids, heat stabilizers, and curing catalysts, in addition to the microspheres. The rubber composition is preferably heated during the blending operation and the microspheres are evenly disbursed within the elastomer. The composition is then heat cured to form a gasket of the desired shape.

Additional objects, features and advantages will be apparent in the description which follows.

DETAILED DESCRIPTION OF THE INVENTION

Figure 1:
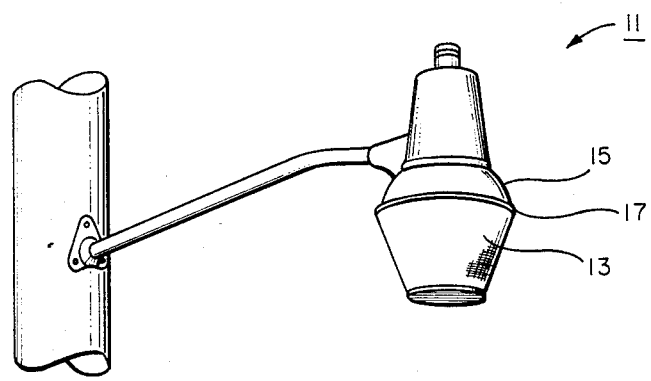
FIG. 1 is a perspective view of a lighting fixture which utilizes a silicone rubber gasket of the invention.
Figure 3:
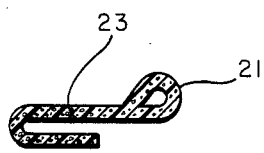
FIG. 3 is a side, cross-sectional view of the lighting gasket of FIG. 2.
Figure 2:
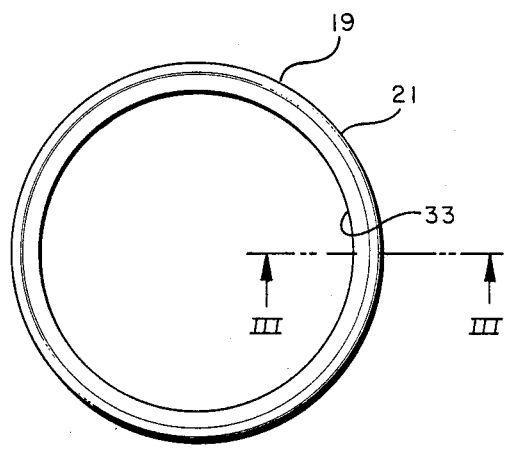
FIG. 2 is a top perspective view of a lighting gasket of the type used in the fixture of FIG. 1.
Figure 4:
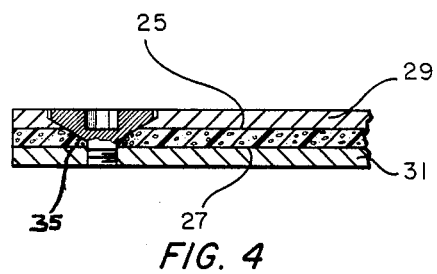
FIG. 4 is a simplified, cross-sectional view of a gasket composition of the invention shown in place between two interfitting components.

Turning to FIG. 1, there is shown an outdoor lighting fixture designated generally as 11. The lighting fixture 11 includes a clear diffuser portion 13 which is supported from a metallic backplate 15. The juncture 17 between the diffuser and backplate is lined with a gasket of the invention, shown in FIG'S. 2 and 3. The gasket includes a body portion 19 formed from a heat cured silicone rubber composition. Although the gasket can assume a variety of shapes and configurations, the body portion 19 will generally include a peripherally continuous outer face 21 and a radially inwardly projecting portion 23 (FIG. 3). The radially inwardly projecting portion 23 includes upper and lower surfaces 25, 27 (FIG. 4) disposed in sealing relation between interfitting components 29, 31. As shown in FIG. 2, the radially inwardly projecting portion has at least one opening 33 therethrough. As shown in FIG. 4, the width of the gasket will generally exceed the thickness by several factors.

The silicone rubber composition utilized to form the gaskets of the invention is adapted to be cured in a mold in the desired shape or extruded and vulcanized. The silicone rubber composition is comprised of an organopolysiloxane elastomer, which has incorporated therein from about 5% to 50% weight percent microspheres. The silicone rubber composition can also contain filler materials, processing aids, heat stability additives, curing catalysts, and other conventional components. The silicone rubber composition is preferably a mixture of an organopolysiloxane elastomer of the type having dimethyl groups on each silicone atom, fumed silica filler, and a peroxide catalyst. Such compositions are well known and can be prepared by standard methods known in the art. A discussion of the preparation of such compounds can be found, for example, in: Eaborn, C., Organo Silicone Compounds, Academic Press, New York, 1960; McGregor, R. R., Silicones and their Uses, McGraw-Hill Book Company, New York, 1954; Meals, R. N., and F. M. Lewis, Silicones, Reinhold Publishing Corp., New York, 1959; Montermoso, J. C., "Silicone Rubbers", Chapter 16, in Morton, E. D., Introduction to Rubber Technology, Reinhold Publishing Corp., New York, 1959; Rochow, E. G., An Introduction to the Chemistry of Silicones, 2nd ed., John Wiley & Sons, New York, 1951.

The silicone elastomer stock utilized in the present invention can contain conventional filler materials. These materials are well known in the art and are commercially available from a number of sources. The filler material is preferably a silica filler, sometimes referred to as reinforcing filler, or a mixture of silica filler and an extending filler. Examples of silica fillers which can be utilized to reinforce the organopolysiloxane elastomer are fumed silica, precipitated silica, silica aerogel, etc. The filler material, including reinforcing and non-reinforcing fillers, is preferably used in the range of about 10–260 parts of filler per hundred parts of organopolysiloxane gum or elastomer, most preferably in the range from about 20–80 parts of filler.

The processing aids which can be utilized in the present invention are well known and include, for example, silanol-terminated polydiorganosiloxanes, such as are taught by the Konkle et al. U.S. Pat. No. 2,890,188, alkoxy-terminated polydiorganosiloxanes, such as are taught by the Fekete U.S. Pat. No. 2,954,357 and silazane, silylamine, or other silicone-nitrogen materials taught by the Martellock U.S. Pat. No. 3,243,404. The alkoxy-terminated polydiorganosiloxanes which can be used, for instance, have from about 4 to 35 chemically combined diorganosiloxane units terminated with alkoxy radicals. For example, suitable materials are alkoxy-terminated, such as methoxy, ethoxy, hydroxy, propoxy and butoxy terminated polydimethylsiloxane, polysiloxane consisting essentially of chemically combined dimethylsiloxy units, diphenyl siloxy units, methylphenylsiloxy units, etc. Mixtures of the aforementioned process aids can also be utilized, such as a mixture of any two of the aforementioned process aids or a mixture of the three process aids such as silanol-terminated polydimethylsiloxane, methoxy-terminated methylphenylpolysiloxane and hexamethyldisilazane.

The processing aid is generally utilized in the range of about 1 to 20 parts processing aid per hundred parts organopolysiloxane gum, most preferably in the range of about 2 to 10 parts processing aid.

The silicone rubber compositions of the invention also have disbursed therein a quantity of hollow spheres or beads of the type referred to as "microspheres". Suitable materials include for instance, epoxy, spheres, ceramic spheres, glass spheres, metal spheres and other such materials. The preferred spheres are commercially available from Zeeland Industries of St. Paul, Minn. as "ZEOSPHERES X-300" and are silica alumina ceramic spheres. Preferably, the spheres selected should have a maximum size of less than about 300 microns, preferably less than 50 microns. The preferred "ZEOSPHERES X-300" have a maximum size of five microns.

The spheres must be strong enough to withstand being blended into the silicone rubber composition without fracturing. Hollow microspheres of the type under consideration can be loosely classified in terms of the wall thickness between the hollow center and the exterior surface of the sphere, using the density of the sphere as a guide to the wall thickness. Thus, a thin wall sphere would have a density on the order of 0.2, a medium wall sphere would have a density of 0.7, and a thick wall sphere would have a density of 2.1. In order to have the required properties, the preferred spheres are those having a density in the range from about 0.5 to 1.2, with the most preferred spheres having a density of about 0.7.

The hollow, microspheres of the invention are preferably present in the silicone rubber composition in the range from about 1 to 50 parts by weight, most preferably in the range of about 30 parts by weight. Using greater relative amount of spheres tends to weaken the rubber composition, while using lower relative amounts reduces the improved characteristics of the product.

Various curing agents can be employed to effect the more rapid conversion of the organopolysiloxane compositions to the cured, solid elastic state including, for example; benzoyl peroxide, 2,5-dimethyl, 2,5-ditertiary-butylperoxyhexane, bis(2,4-dichlorobenzoyl)peroxide, etc. If the siloxane polymer contains both vinyl and Si—H bonds, chloroplatinic acid would be a suitable catalyst. The preferred catalyst are 2,4-dichlorobenzoyl peroxide and dicumyl peroxide. These curing agents, or vulcanization accelerators as they are often called, can be present in the organopolysiloxane compositions in amounts ranging from about 0.1 to 8 parts or more based on 100 parts of organopolysiloxane blend.

In addition to the above described ingredients, the silicone rubber compositions of the invention can contain heat stability additives, compression set additives, additives to improve handling properties, dyes or coloring additives, additives to prevent crepe aging and other additives conventionally found in heat cured silicone elastomers.

In the preferred method of forming a gasket of the invention, the silicone rubber composition is made by blending or milling together the various constituents. The order of adding the elastomer, filler, microspheres, and additional processing additives is not critical. Preferably, the organopolysiloxane elastomer, filler material, microspheres, and conventional additives are mixed together to form the uncured rubber composition. The rubber composition can be heated during the blending operation and the microspheres are evenly disbursed within the composition without breaking the microspheres. Although the preferred method of blending is to hot mix the rubber composition, it will be understood that the composition could also be cold mixed. The preferred rubber composition is then cooled, a conventional curing agent is added, and the composition is placed in a suitable mold, and heat cured to form the gasket. It will be understood to those skilled in the art that the composition can also be extruded to form the final product. The temperatures at which the rubber compositions are cured to the solid elastomeric state depend upon the particular curing catalyst chosen, the duration of cure, amount and type of filler, etc.

The gaskets of the invention are thus made from silicone rubber compositions which are heat curable to an elastomer and which comprise:

(a) a mixture of 100 parts by weight of an organopolysiloxane polymer in which the organic substituents are preferably methyl, or up to about 15 mole percent vinyl radials;
(b) about 30 parts by weight of a fumed silica filler with a surface area of 100 to 300 square meters per gram;
(c) from 1 to about 50 parts by weight of ceramic microspheres with a specific gravity between about 0.5 and 1.2;
(d) a catalytic quantity of a curing catalyst.

In order that those skilled in the art will be better able to practice the invention, the following examples are given by way of illustration and not by way of limitation. All parts are parts by weight.

EXAMPLE 1

A heat stable silicone rubber seal was obtained from a compound with the following ingredients:
(a) 44 parts by weight of a trimethyl-end stopped dimethylpolysiloxane of 5,000 siloxane units;
(b) 30 parts by weight of a trimethyl-end stopped methylvinylpolysiloxane of 5,000 siloxane units, the vinyl content is 0.2 mole percent of the polymer;
(c) 21 parts by weight of a fumed silica with a surface area of 200 square meters per gram;
(d) 5 parts by weight of a hydroxyl-end stopped dimethylpolysiloxane having a molecular weight of approximately 700;
(e) 0.3 parts by weight of a conventional heat stabilizer;
(f) 27 parts by weight of ground quartz of ten micron size;
(g) 27 parts by weight ceramic microspheres having a specific gravity of 0.7;
(h) 1.3 parts by weight of a 1:1 mixture of silicone fluid and 2-4 dichlorobenzoyl peroxide.

A comparison compound was also prepared in which the microspheres (component G above) were replaced by ground quartz of 10 micron size. Each compound was cured using molding conditions of 240° F. for 10 minutes and the compounds were then post cured at 400° F. for four hours. Molded slabs were tested and heat aged and the results are shown in Table 1.

TABLE 1

|  | Silicone Rubber Composition with Microspheres | Silicone Rubber Composition without Microspheres |
| --- | --- | --- |
| Initial Hardness | 59° | 58° |
| Specific Gravity | 1.18 | 1.45 |
| Heat Aging (24 hours at 525° F.) | | |
| Hardness after Aging | 58° | 67° |

The rubber composition of the invention containing the microspheres was not only cost effective because of the lower specific gravity, but also did not embrittle upon heat aging.

EXAMPLE 2

The process of Example 1 was repeated with components (a), (b), (d), (e), and (h) remaining unchanged. Component (c) was changed to 30 parts by weight, component (f) was eliminated, and component (g) was changed to 30 parts by weight of ceramic microspheres.

This compound was compared with a compound containing no microspheres and with the 30 parts of microspheres replaced by seven parts of extra fumed silica. Both compounds were molded to ASTM slabs using molding conditions of 240° F. for 10 minutes and were post cured at 400° F. for 4 hours. The test results are shown in Table 2.

TABLE 2

|  | Silicone Rubber Composition with Microspheres | Silicone Rubber Composition without Microspheres |
| --- | --- | --- |
| Initial Hardness | 75° | 75° |
| Specific Gravity | 1.09 | 1.24 |
| Compression Set (22 hours at 212° F.) | 16% | 24% |
| Heat Aging (70 hours at 212° F.) | | |
| Hardness after Aging | 75° | 77° |

The rubber composition containing microspheres was not only cost effective but exhibited an improved compression set. This made the rubber composition ideal for use as a window seal gasket.

EXAMPLE 3

An oil resistant rubber gasket was obtained from a compound having the following ingredients:
(a) 68 parts by weight of a trimethyl end-stopped dimethylpolysiloxane of approximately 5,000 siloxane units;
(b) 4 parts by weight of a dimethylvinyl end-stopped methylvinylpolysiloxane of 5,000 siloxane units; and having a vinyl level of 13 mole percent;
(c) 22 parts by weight of a fumed silica with a surface area of 200 per square meters per gram;
(d) 5 parts by weight of a hydroxyl end-stopped dimethylpolysiloxane having a molecular weight of approximately 700;
(e) 0.3 parts of a conventional heat stabilizer;
(f) varying parts by weight of ceramic microspheres of a specific gravity of 0.7, as will be shown;
(g) 0.5 parts by weight, 2.5-dimethyl, 2.5-di(t-butylperoxy)hexane.

Compounds with varying levels of component (f) were molded into rubber slabs using molding conditions of 340° F. for 10 minutes and post curing of 400° F. for 4 hours. The cured rubber slabs were tested for physical characteristics and were also tested in engine oil, i.e., 10W-30 oil, as specified in ASTM method D471-79. The test period was 302° F. for 70 hours. The results are shown in Table 3.

TABLE 3

|  | Parts by Weight of Component (f) | | | |
| --- | --- | --- | --- | --- |
|  | 0 | 5 | 10 | 20 |
| Initial Hardness (SHORE, ASTM D2240) | 42° | 47° | 50° | 55° |
| Initial Tear Strength ASTM D624 (1 lbs. 1 inch) | 160 | 150 | 120 | 100 |
| Oil Resistance | | | | |
| Final Hardness | 25° | 41° | 39° | 42° |
| % Volume Swell | +32% | +27% | +25% | +20% |

The rubber composition containing microspheres was not only cost effective, but exhibited improved oil resistance when compared with a standard silicone rubber composition.

An invention has been provided with significant advantages. A lighting gasket can be provided of the improved silicone rubber composition, as shown in FIG'S. 1–3. With normal silicone rubber seals, there is a tendency for the mating flanges of the fixture to be over tightened, leading to severe damage and subsequent failure of the seal. As shown in FIG. 4, the presence of the ceramic microspheres at the torque loading position (35 in FIG. 4) serves as a self-limiter for the seal which counters the tendency to over-tighten the fixture. When the improved seal is in place and tightened down, the silicone rubber-microsphere seal has a lower water vapor permeability as compared to a silicone rubber seal of the past. The silicone rubber-microsphere seal has approximately 40% less silicone than a normal seal, and therefore there are 40% less silicone volatiles to be released when the light heats up.

The same advantages apply to an oil seal, in that it is more difficult to overtighten the seal and the seal exhibits lower permeability, in this case to the oil. The silicone rubber-microsphere compositions of the the invention have a lower volume swell when immersed in engine oil.

The gasket compositions of the invention also provide superior window seals and have the advantage over traditional silicone rubbers of cost effectiveness, lower water vapor permeability and lower compression set values.

Improved oven door seals can also be provided using the compositions of the invention. The advantages over normal seals are cost effectiveness, no loss in heat stability, and lower compression set values.

While the invention has been shown in only one of its forms, it is not thus limited but is susceptible to various changes and modifications without departing from the spirit thereof.

I claim:

1. A method of forming a heat cured silicone rubber gasket, comprising:
   blending a silicone rubber composition from an organopolysiloxane elastomer, a filler material, and a quantity of ceramic microspheres having a specific gravity in the range from 0.5 to 1.2 and a suitable quantity of a catalyst; and
   heat curing said composition to form a gasket.

2. The method of claim 1, wherein said ceramic spheres are silica alumina ceramic spheres having a density of about 0.7.

3. A silicone rubber composition heat curable to a gasket material, comprising:
   100 parts by weight of an organopolysiloxane polymer in which the organic substituents are selected from the group consisting of methyl and methylvinyl radicals;
   about 30 parts by weight of a fumed silica filler having a surface area of about 100 to 300 square meters per gram;
   from about 5 to 40 parts by weight ceramic microspheres having a specific gravity between about 0.5 and 1.2; and
   a catalytic quantity of a curing catalyst.

4. The silicone rubber composition of claim 3, wherein said ceramic microspheres are present in the range from about 20 to 35 parts by weight of the composition.

5. The silicone rubber composition of claim 4, wherein said ceramic microspheres have a specific gravity of about 0.7.

6. An improved gasket for joining and sealing interfitting components, the gasket comprising:
   a body portion formed from a heat cured silicone rubber composition and including a peripherally continous outer face and a radially inwardly projecting portion having upper and lower surfaces disposed in sealing relation between said interfitting components, said radially inwardly projecting portion having at least one opening therethrough; and
   said heat cured silicone rubber used to form said gasket having evenly disbursed therein from 5 to 50 parts by weight of ceramic microspheres having a specific gravity in the range from 0.5 to 1.2.

7. The improved gasket of claim 6, wherein said silicone rubber composition comprises a mixture of 100 parts by weight of an organopolysiloxane polymer approximately 30 parts by weight of a fumed silica filler with a surface area of 100 to 300 square meters per gram, from 1 to 50 parts by weight of ceramic microspheres having a specific gravity between 0.5 and 1.2, and a catalytic quantity of a curing catalyst.

* * * * *

UNITED STATES PATENT AND TRADEMARK OFFICE
CERTIFICATE OF CORRECTION

PATENT NO. : 4,580,794
DATED : April 8, 1986
INVENTOR(S) : Robert M. Gibbon

It is certified that error appears in the above-indentified patent and that said Letters Patent is hereby corrected as shown below:

On the title page, under item [19] and item [75], change "Gibbons" to --Gibbon--.

On the title page, item [54] and column 1, line 2, change "SILICON" to --SILICONE--.

Signed and Sealed this

Twenty-ninth Day of March, 1994

Attest:

BRUCE LEHMAN

*Attesting Officer*     *Commissioner of Patents and Trademarks*